Feb. 21, 1939. S. E. TRACY Re. 21,011

RAILWAY SWITCH

Original Filed Oct. 1, 1935 2 Sheets-Sheet 1

INVENTOR
STARK E. TRACY
BY S. P. Wolhaupter
his ATTORNEY

Feb. 21, 1939.

S. E. TRACY

RAILWAY SWITCH

Original Filed Oct. 1, 1935

2 Sheets-Sheet 2

Re. 21,011

INVENTOR

STARK E. TRACY

BY S. T. Wallaupton his ATTORNEY

Reissued Feb. 21, 1939

Re. 21,011

UNITED STATES PATENT OFFICE 21,011

RAILWAY SWITCH

Stark E. Tracy, Riverside, Ill.

Original No. 2,039,200, dated April 28, 1936, Serial No. 43,101, October 1, 1935. Application for reissue October 12, 1937, Serial No. 168,682

7 Claims. (Cl. 246—435)

This invention relates to improvements in railway switches, and has generally in view to provide simple, inexpensive and effective means to avoid the chipping, cracking and breaking of switch point rails.

It is well known that the constant rolling of railway rails by locomotive and car wheels passing thereover results in deformation of the upper portions of the heads of the rails toward the center line of the track. It is equally well known that such deformation of the heads of switch stock rails heretofore has constituted a major cause of chipping, cracking and breaking of switch point rails, because the deformations or projections at the upper, inner sides of the heads of the stock rails have prevented proper seating of the switch point rails against the inner sides of the stock rails and, by engagement with the thinner, weaker, upper portions of the switch point rails, have caused such portions to become chipped, cracked or broken under the pressure exerted by the switch throwing mechanism or under the pressure or impact of car wheel flanges thereagainst. Accordingly, the object of the present invention is so to construct switch point rails that they are not held by deformations or projections at the upper, inner sides of the heads of switch stock rails against seating properly against the inner sides of the stock rails or, alternatively, so to form the upper inner sides of the heads of switch stock rails that any deformation of such portions of the stock rails is rendered ineffective to prevent proper seating of the switch point rails thereagainst, thus in either case to avoid chipping, cracking, or breaking of the thinner, weaker, upper portions of the switch point rails due to switch throwing mechanism pressures or wheel flange pressures exerted thereagainst.

With the foregoing general object in view, the invention consists in the novel features of construction of switch point rails and, or, switch stock rails, as will be hereinafter more fully described, illustrated in the accompanying drawings and defined in the appended claims.

In the drawings, wherein like characters of reference denote corresponding parts in related views:—

Figure 1:
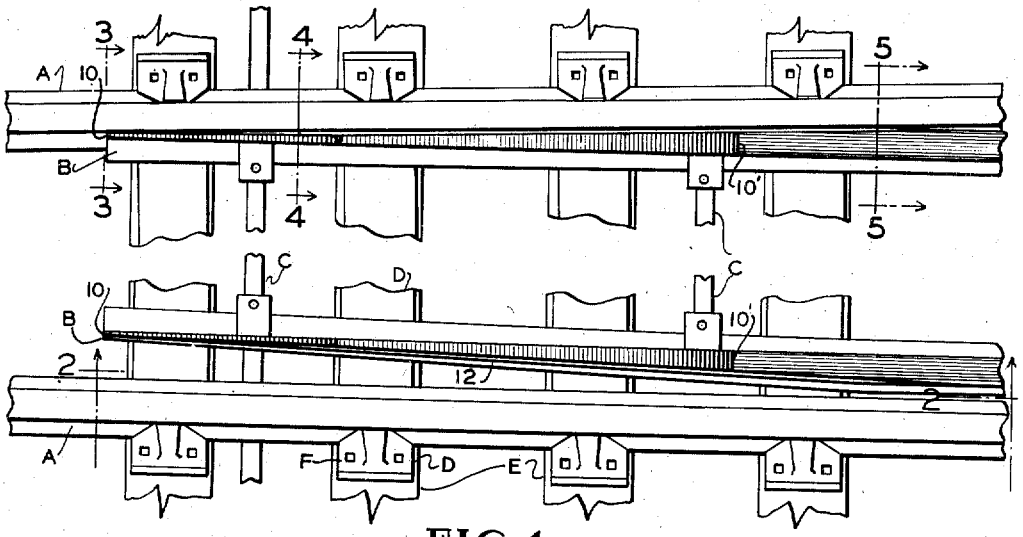
Figure 1 is a top plan view of a railway switch having switch point rails constructed in accordance with the invention.
Figure 2:
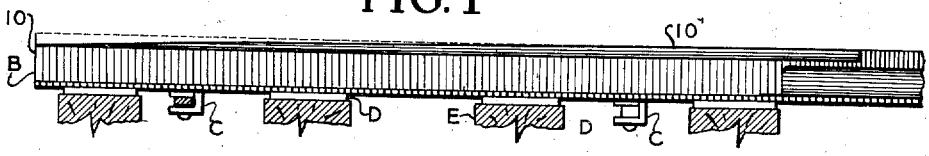
Figure 2 is a longitudinal section on the line 2—2 of Fig. 1 showing the planed side of one of the switch point rails in elevation.
Figures 3, 4, 5:
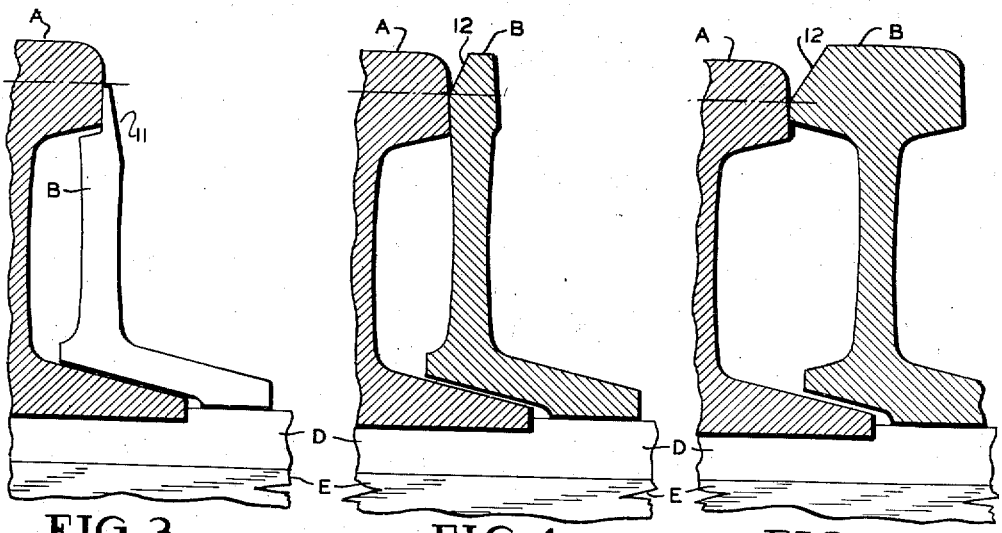

Figures 3, 4 and 5 are cross-sections on the lines 3—3, 4—4 and 5—5, respectively, of Fig. 1.

Figure 6:
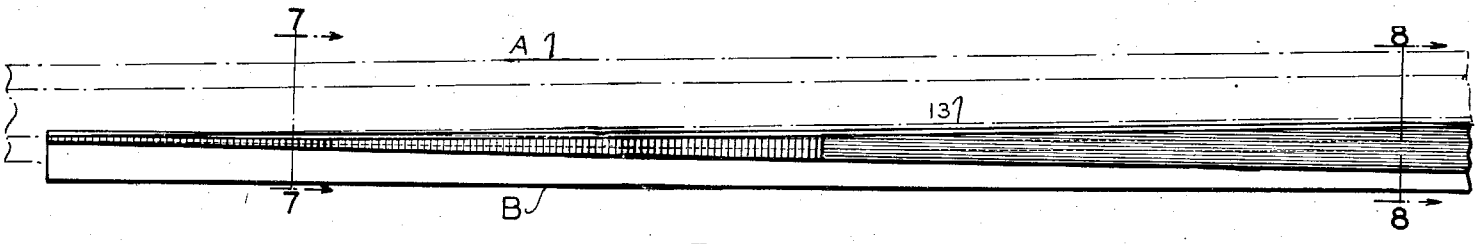
Figure 8:
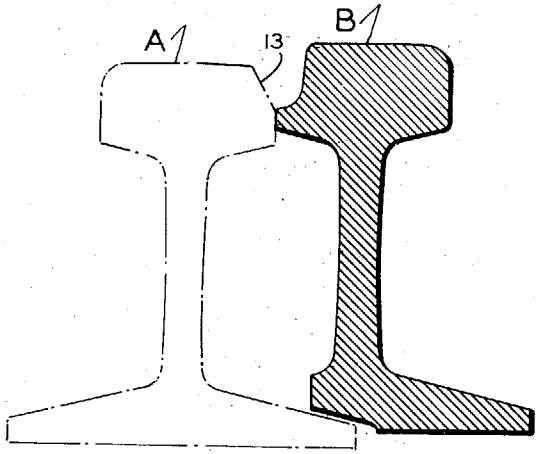
Figure 7:
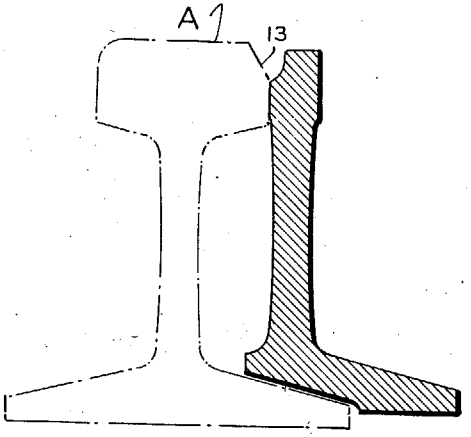

Figure 6 is a top plan view illustrating a modified form of switch point rail; and Figures 7 and 8 are cross-sections on the lines 7—7 and 8—8, respectively, of Fig. 6.

Referring to the drawings in detail, first to the embodiment of the invention illustrated in Figs. 1 to 5, A, A designate a pair of switch stock rails and B, B, designate a cooperating pair of switch point rails, supported, as usual, between the switch stock rails on plates D resting on the cross ties E and connected together by rods C for unitary shifting movement or "throwing" between either of two operative positions, in one of which one of the switch point rails seats against the inner side of the related stock rail and the other switch point rail is spaced from its related stock rail, and in the other of which the last mentioned switch point rail seats against the inner face of its related stock rail and the first mentioned switch point rail is spaced from the other stock rail, all as is common and well-known in the railway switch art.

Also, in accordance with common and well-known practice, the present switch point rails are side cut or planed at their sides adjacent to their related stock rails so that, beginning at points suitably spaced from their free ends, they are gradually reduced in width or thickness to their free ends where they are relatively thin. In addition, they are top cut or planed in accordance with common and well-known practice so that at their free ends their tops are disposed below the tops of the stock rails (about in the horizontal plane of the gage line of the rails, which plane lies about five-eighths of an inch below the tops of the stock rails), and so that, from their free ends or vertices 10 inwardly to points suitably spaced therefrom, their tops are inclined upwardly either to or above the plane of the tops of the stock rails; i. e. to points, designated as 10′, where the switch point rails are of full, or approximately full, height. Moreover, from their free ends or vertices inwardly suitable distances said switch point rails are, or may be, chamfered at their inner or gage sides, as indicated at 11 in Fig. 3, so that at and adjacent to their free ends or vertices they have relatively thin or sharp edges for initial engagement by wheel flanges to avoid shock when the wheels of cars or locomotives enter the switch.

In the foregoing connection the prior common practice in the construction of switch point rails has been to cut or plane them at their sides adjacent to the stock rails for seating engagement throughout the height of their tops or heads with the inner sides of the heads of the related stock rails. When the stock rails are new, switch point rails as thus heretofore constructed cooperate therewith very satisfactorily. When, however, due to the rolling and rail head deforming action of locomotive and car wheels passing over the stock rails, projections or protuberances are produced at the upper, inner sides of the heads of said rails, the said projections or protuberances no longer permit full seating engagement of the switch point rails against the inner sides of the heads of the stock rails. On the contrary, said projections or protuberances are engaged by the thinner, weaker, upper portions of the switch point rails and hold the latter rails from seating against the inner sides of the heads of the stock rails below the protuberances. The result is that when the switch is thrown the thinner, weaker, upper portion of one or the other of the switch point rails, as the case may be, is jammed against the protuberances of the related stock rail with consequent chipping, cracking or breaking of the said thinner, weaker, upper portion of the switch point rail; or, if the switch point rail is not chipped, cracked or broken by the act of throwing the switch, it is likely to be chipped, cracked or broken by the impact and pressure of car wheels thereagainst due to its relatively thin line of support, where it is weakest, against the stock rail protuberance and because it is spaced from the side of the head of the stock rail below the protuberance thereof. Moreover, entirely aside from any chipping, cracking or breaking of switch point rails as heretofore constructed due to either of the causes mentioned, there is the grave possibility and likelihood that when a switch point rail is held by a stock rail deformation or protuberance against proper seating with the inner side of the head of the stock rail, a derailment and wreck may occur.

According to one practical embodiment of the present invention the upper portions of the switch point rails are side cut or recessed at their sides adjacent to the related stock rails, as indicated at 12, to provide clearance spaces to accommodate any projections or protuberances which may develop at the upper, inner sides of the heads of the stock rails.

The gage line of a rail is a line extending along the inner side of the head of the rail a distance of approximately five-eighths of an inch below the top of the head, and invariably any protuberance at the inner side of the head of a rail resulting from rail deformation by rolling stock passing thereover is confined to the area above said gage line. The side cutting or recessing of the switch point rails as at 12 therefore is extended from the tops of said rails downwardly to points approximately in the horizontal plane of the gage line of the stock rails, the recessing being effected either by beveling the switch point rails at suitable inclinations as illustrated in Figs. 1 to 5, or by removing substantially rectangular sections of metal therefrom as illustrated in Figs. 6 to 8. The recessing begins approximately at the vertices of the switch point rails, or, in other words, at the points where the top cutting or planing of said rails intersects the gage line of the stock rails, and is continued inwardly along the switch point rails any suitable or desired distances, terminating, for example, at what is known as the head separation of the rails; i. e., at the points where the switch point rails assume full width and are constantly spaced from the stock rails.

Because of the stock rail protuberance clearance spaces afforded by the recessing of the upper portions of the switch point rails at their sides adjacent to the stock rails, protuberances at the upper, inner sides of the heads of the stock rails do not interfere with seating of the switch point rails against the inner or gage sides of the stock rails below said protuberances. Therefore, chipping, cracking or breaking of the present switch point rails due to throwing of the switch as to wheel flange impact or pressure is practically eliminated.

Instead of, or in addition to, recessing of the switch point rails as at 12, the upper, inner corners of the stock rails may be beveled or otherwise cut away as indicated at 13 in Figs. 7 and 8. In this way any inward deformation of the upper portions of the heads of the stock rails beyond the planes of the inner sides of the heads of the stock rails may be avoided, thus avoiding any interference of such deformations of the stock rails with proper seating of the switch point rails against the inner sides of the heads of the stock rails.

In the development of modern, high speed trains there have been designed coneless wheels which are characterized by having concave fillets adjacent to the flanges thereof. When such a wheel passes over a switch in which the upper corner of a switch point rail adjacent to the related stock rail is disposed substantially in the plane of the inner side of the heads of the stock rail there exists the danger that a sudden side thrust of the wheels may result in the wheel shoulders formed by the fillets engaging the said corner of the switch point rail and forcing the switch open. By cutting or recessing switch point rails as at 12 in accordance with the present invention any danger of wheels of the character mentioned forcing the switch open is effectively avoided because the aforementioned corners of the switch point rails are at all times spaced inwardly from the planes of the inner sides of the related stock rails.

The present switch point rails obviously may be produced practically as cheaply and easily as prior switch point rails, since they differ from prior switch point rails essentially in the side cutting or recessing thereof as indicated at 12 and this side cutting or recessing may be done simultaneously with either the usual side or top planing.

I claim:

1. In a railway switch, a stock rail, and a cooperating switch point rail, one of said rails having its upper corner truncated throughout the length of that part of the switch rail which extends above the gage line of the stock rail thus forming a recess which is of a sectional area to accommodate any normal lateral and inward deformation of the head of the stock rail due to the rolling action of car wheels passing thereover, the position of the switch point relative to the stock rail thereby remaining unchanged during a normal amount of deformation of the rail head.

2. In a railway switch, a stock rail, and a cooperating switch point rail, one of said rails having a recess at its upper corner throughout the length of that part of the switch rail which extends above the gage line of the stock rail which recess extends substantially from the free end of the switch point rail to the head separation of the rails and is of a sectional area to accommodate any normal lateral and inward deformation of the head of the stock rail due to the rolling action of car wheels passing thereover, the position of the switch point relative to the stock rail thereby remaining unchanged during a normal amount of deformation of the rail head.

3. In a railway switch, a stock rail, and a switch point rail, one of said rails having a recess at its upper corner throughout the length of that part of the switch rail which extends above the gage line of the stock rail which recess extends downwardly approximately to the gage line of the stock rail and longitudinally substantially from the free end of the switch point rail to the point of head separation of the rails and is of a sectional area to accommodate any normal lateral and inward deformation of the head of the stock rail due to the rolling action of car wheels passing thereover, the position of the switch point relative to the stock rail thereby remaining unchanged during a normal amount of deformation of the rail head.

4. In a railway switch, a stock rail, and a cooperating switch point rail, the switch point rail having a recess at its upper corner throughout the length of that part of the switch rail which extends above the gage line of the stock rail to accommodate any normal lateral and inward deformation of the head of the stock rail due to the passage of car wheels thereover, the position of the switch point relative to the stock rail thereby remaining unchanged during a normal amount of deformation of the rail head.

5. In a railway switch, a stock rail, and a cooperating switch point rail, at least one of said rails being side cut at its side through the length of that part of the switch rail which extends above the gage line of the stock rail so that the switch point rail contacts with the head of the stock rail only below the gage line of the latter rail.

6. In a railway switch, a stock rail, and a cooperating switch point rail, at least one of said rails being side cut at its side adjacent to the other rail and above the gage line of the stock rail between the point where the top cutting of the switch point rail intersects the gauge line of the stock rail and the point of head separation of the rails, so that the switch point rail contacts with the head of the stock rail only below the gage line of the latter rail.

7. In a railway switch, a stock rail and a cooperating switch point rail, one of said rails having its upper corner, adjacent the other rail, truncated to provide a metal-receiving recess between the two rails to accommodate lateral and inward deformations at the inner side of the stock-rail-head due to wheel rolling action, the said metal-receiving recess extending downwardly to a point below the area in which said deformation normally occurs, and extending continuously in a longitudinal direction coextensive with that portion of the side face of the stock-rail-head against which the switch point rail is adapted to closely seat.

STARK E. TRACY.